United States Patent

[11] 3,615,863

| [72] | Inventors | Ching-Koon Pun;<br>Ching-Chau Poon, both of P.O. Box 5538, Kowloon, Hong Kong, |
|---|---|---|
| [21] | Appl. No. | 842,119 |
| [22] | Filed | July 16, 1969 |
| [45] | Patented | Oct. 26, 1971 |
| [32] | Priority | July 24, 1968 |
| [33] | | Great Britain |
| [31] | | 35368/68 |

[54] ELECTRIC DRY CELLS
14 Claims, 7 Drawing Figs.

[52] U.S. Cl. .................................................. 136/131, 136/133
[51] Int. Cl. ........................................................ H01m 3/04
[50] Field of Search ............................................ 136/107, 131, 132, 133

[56] References Cited
UNITED STATES PATENTS

| 415,333 | 11/1889 | Payen | 136/143 |
| 494,849 | 4/1893 | Elieson | 136/143 |
| 683,494 | 10/1901 | Porter | 136/145 |
| 1,395,281 | 11/1921 | Koretzky | 136/133 X |
| 1,552,414 | 9/1925 | Apostoloff | 136/133 UX |
| 2,175,686 | 10/1939 | Eddy | 136/133 |
| 2,633,479 | 3/1953 | Bidard et al. | 136/145 |
| 3,257,241 | 6/1966 | Tamminen | 136/143 X |

FOREIGN PATENTS

| 671,608 | 10/1963 | Canada | 136/133 |

Primary Examiner—Donald L. Walton
Attorney—Bacon and Thomas

ABSTRACT: An electric dry cell in which the depolarizing dolly is centralized in the cup electrode, and spaced from its wall, by spacing means incorporating one or more elongate moulded plastics spacing members shaped so as to make only line or point contact with the cup electrode wall so as to minimize obstruction of the passage of current between the electrolyte and the cup electrode.

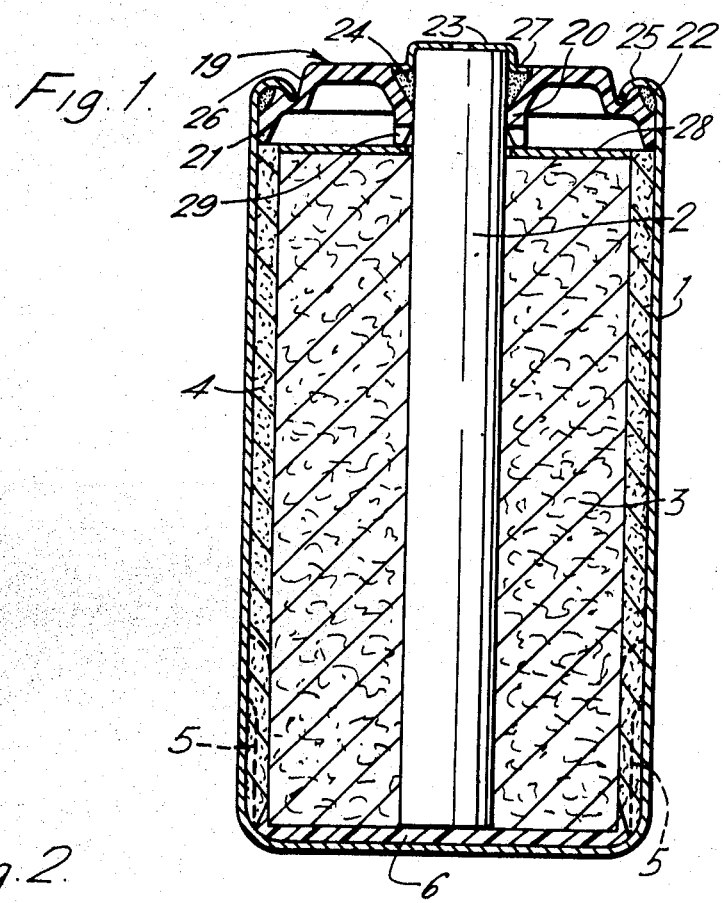
Fig. 1.
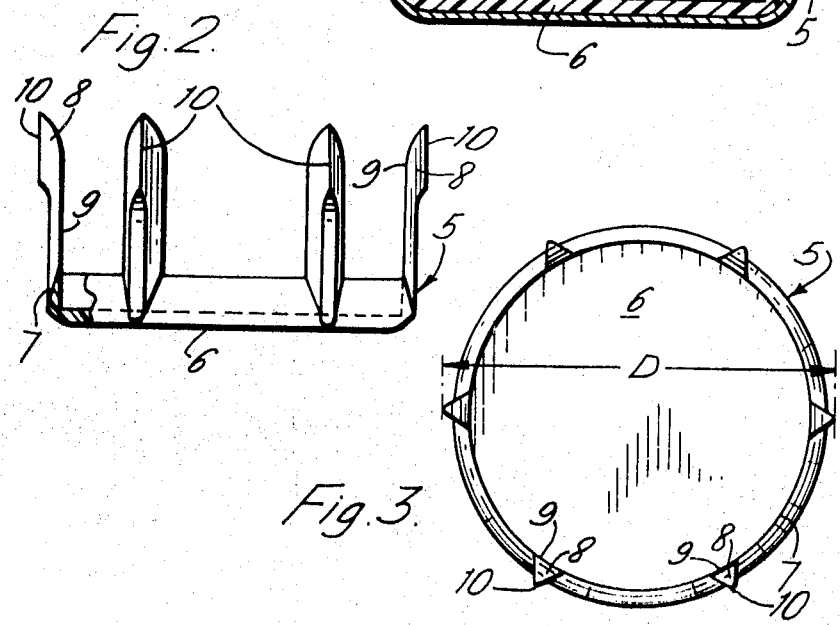
Fig. 2.
Fig. 3.
INVENTORS
CHING KOON PUN
CHING CHAU POON
BY Bacon & Thomas ATTORNEYS

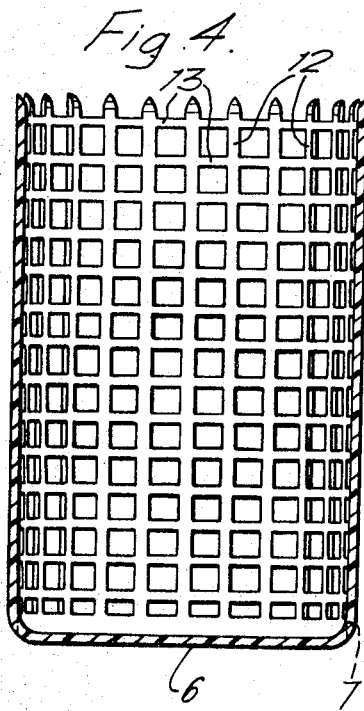
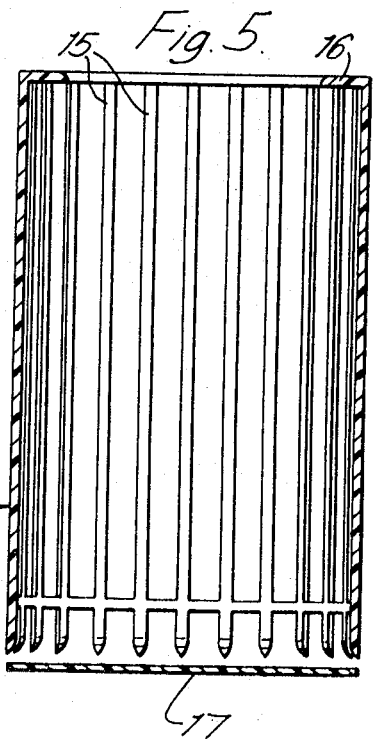
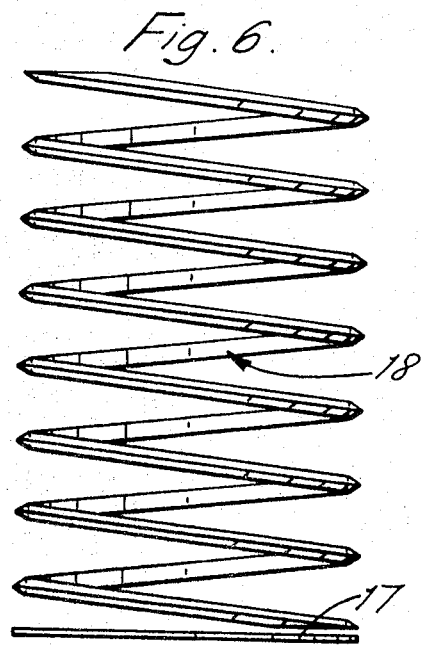
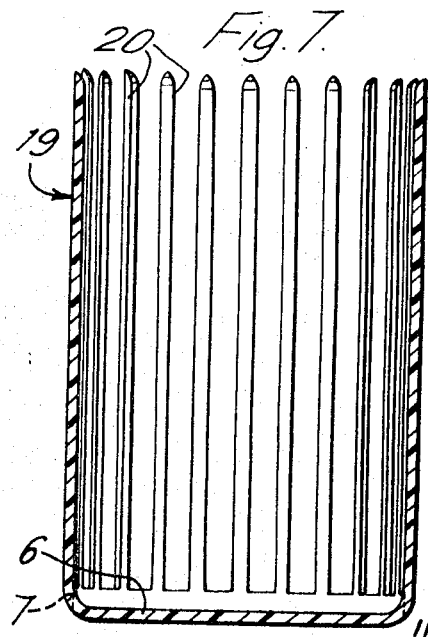
INVENTORS
CHING KOON PUN
CHING CHAU POON
BY Bacon & Thomas ATTORNEYS

ELECTRIC DRY CELLS

This invention relates to electric dry cells of the kind in which the major part of the space between the central rod electrode and the inside wall of the cup electrode or can is filled by a depolarizing dolly surrounding the rod electrode, and the narrow tubular gap between the dolly and the cup wall is filled by electrolytic paste which is poured into such gap during the assembly of the cell. Such dry cells are those hereinafter referred to as being "of the kind described."

It is important that the depolarizing dolly should be maintained out of contact with the cup electrode particularly while the electrolytic paste is being introduced around it and is subsequently setting, as engagement of the dolly with the cup wall would of course cause a short circuit, and it is known for this purpose to provide spacing means in the form of a sheet of wax impregnated cardboard or like semirigid material which sits on the base of the cup electrode and has a number of integral upstanding fingers around its periphery which extend up between the dolly and the inside wall of the cup electrode and thus serve to space the dolly from the cup electrode wall while the electrolyte paste is being poured. It has been found, however, that the said upstanding fingers of the known spacing means, if they are extensive enough to be effective in their spacing function, constitute an undersirable obstruction to the passage of current between the electrolyte and the wall of the cup electrode and thus reduce the efficiency of the cell.

It is a primary object of the present invention to provide a dry cell in which the above disadvantages are substantially reduced.

Thus according to the invention there is provided an electric dry cell of the kind described including spacing means located in the tubular gap between the depolarizing dolly and the wall of the cup electrode for maintaining the dolly out of engagement with the cup wall, such spacing means comprising one or more elongate spacing members formed of moulded plastics electrical insulating material and being so shaped as to make only substantially line or point contact with the cup electrode wall.

With such an arrangement of the said spacing means the passage of current between the electrolyte and the cup electrode is obstructed to only a very small extent. Nevertheless the spacing means can still be constructed to provide sufficient support for the dolly to locate it substantially centrally within the cup during the pouring and setting of the electrolyte paste.

It should be understood that owing to dimensional tolerances in the manufacture of cells according to the invention the or each spacing member of a cell as set forth above will not necessarily actually engage the cup electrode wall at every part thereof which is so shaped as to make line or point contact with the said wall. It is rather the object of the invention to ensure that where such engagement does occur it will be by way of line or point contact.

The said spacing member or members may take any convenient form. In a preferred form of the invention the or each such member is of substantially triangular shape in transverse cross section at least where it engages the inside wall of the cup electrode, the arrangement being such that one face of such triangular section faces inwardly towards the dolly while the apex opposite such face faces outwardly towards the cup electrode wall; contact of such a member with the cup wall may be reduced still further by scalloping the apex line of its triangular profile so that the member makes a plurality of point contacts with the cup wall. Alternatively the spacing member(s) may be of circular or oval shape in cross section.

In one form of the invention the said spacing means may be integral with a plastics base element which underlies the dolly to provide the necessary insulation between the floor of the cup electrode and the bottom ends of the dolly and the rod electrode, in which case a number of spacing members may be provided in the form of fingerlike members upstanding from the periphery of the base element. It may not be necessary for such spacing members to be in engagement with the cup electrode wall over their whole height, and in one form of the invention such upstanding members are arranged to contact the cup electrode wall only in their upper regions. In other forms, however, such members may extend the whole height of the dolly and engage the cup wall throughout their length; in such embodiments one or more integral supporting bands may be provided which interconnect the said spacing members at one or more levels to maintain them in their desired relative positions. An advantage of extending the spacing means to the whole height of the dolly is that undesired expansion of the dolly by takeup of liquid electrolyte paste is thereby restricted over its whole height.

In another alternative the spacing means comprises a number of parallel fingerlike members of the kind just referred to which members are supported from an integral ring resting flat on the top surface of the dolly around its periphery. Integral supporting bands for such members may again be provided to maintain them in mutual parallelism.

In a further form of the invention the spacing means comprises a single elongate spacing member of helical configuration surrounding the dolly over the whole or part of its height; such a member could be integral with a plastics base element or with a top ring as previously referred to, or may be provided alone.

In yet another embodiment the spacing means comprises a number of parallel elongate spacing members which are constituents or a netlike moulded plastics sheet which will be wrapped around the dolly.

If desired the spacing means may be extended above the top surface of the dolly and serve to support a plug closing the open end of the cup electrode, thus making it unnecessary to provide a supporting shoulder therefor around the inside wall of the cup.

Although, as will be appreciated from the above description, the number of spacing members provided may vary considerably, the provision of a comparatively large number of such members has the advantage that they may be made comparatively thin while still providing adequate support around the dolly, so permitting the size of the dolly, and thereby the power of the cell, to be increased. In a specific example the diameter of the dolly may be increased by at least about 1 mm. over that of a cell incorporating conventional spacing means, which is a useful increase where small cells are concerned.

The depolarizing dolly, when manufactured by a conventional process, will usually have an uneven perimetric edge at its bottom end and it is desirable that any protruding pieces of the depolarizing material should be removed from such edge before the dolly is placed in the cup electrode, to prevent the short circuit that would result from any such part of the dolly coming into contact with the cup electrode.

The removal of any such protruding pieces of the dolly can be achieved more easily than hitherto if the said spacing means is provided with an integral base element formed with an upstanding knife-edged perimetric flange, so that when the spacing means is engaged on the dolly during assembly of the cell the edge of such flange will cut off any protruding pieces from around the edge of the dolly before it is inserted in the cup electrode.

It will however, be appreciated that many forms of cell incorporating spacing means in accordance with the invention may be provided with a conventional insulating element separating the dolly and the rod electrode from the floor of the cup electrode, such as a disc of wax-impregnated cardboard for example.

A plug will as usual be provided in the mouth of the cup electrode to close the open end of the cell; such plug is preferably formed as a moulding of electrically insulating plastics material and may be sealingly associated with the mouth of the cup electrode and with the top end of the rod electrode in the manner described and claimed in our copending U.S. Pat. application, Ser. No. 842,274 filed July 16, 1969. Thus the said plug is preferably gripped around its periphery by the inturned rim of the cup electrode and has a central aperture whose wall embraces the outer end region of the rod electrode, a first annular enclosed space being provided between a peripheral face of the plug and the inside surface of the inturned rim of the cup electrode, and a second annular enclosed space being provided between a face of the central aperture of the plug and the wall of the rod electrode, both of such spaces being filled with sealing material.

It should be understood that the cell in general, although usually of circular section, may be of any desired cross-sectional shape, and the sectional configuration of the tubular gap between the dolly and the cup electrode, and thus of the spacing means, may vary correspondingly.

In order that the invention may be more readily understood the relevant features of one form of dry cell constructed in accordance with the invention, together with certain modifications thereof, will now be described by way of example and with reference to the accompanying drawings, in which:

FIG. 1 is a vertical axial cross-sectional view of a dry cell according to the invention;

FIG. 2 is a side elevational view of the spacing means of the cell of FIG. 1;

FIG. 3 is a plan view of such spacing means; and

FIGS. 4 to 7 are views of four modified forms of spacing means for use in the cell of FIG. 1.

Referring to FIGS. 1 to 3, the cell includes a conventional cylindrical cup electrode or can 1 and a rod electrode 2 positioned centrally and coaxially of the cup. The depolarization dolly 3 surrounding the rod electrode is of a conventional nature in the form of a self-supporting cylindrical block of depolarizing material having an axial cylindrical aperture for the rod electrode, the annular gap defined between the outside of the dolly and the inside wall of the cup being filled with pourable electrolytic paste 4; the dolly is provided with a top cover plate 28 of plastics material.

The depolarizing dolly 3 is located centrally and coaxially of the cup electrode 1 by spacing means in the form of a cuplike spacing element 5 formed of moulded plastics material of an electrical insulating nature, such as polyethylene, p.v.c. or the like for example. The spacing element 5 has a base 6 in the form of a circular tray having an upstanding perimetric flange 7, and six fingerlike spacing members 8 upstanding from the perimeter of such base at equally spaced points therearound. All of the spacing fingers 8 are identical and each is of substantially trapezoidal shape in transverse cross section over about the first two-thirds of its height, the top one-third of the finger being of triangular cross section having a flat surface 9 facing inwardly of the spacing element and the apex 10 opposite such surface facing outwardly and extending radially of the spacing element beyond the plane of the outside face of the trapezoidal part of the finger; in other words each finger can be regarded as being of triangular section but with the outwardly facing apex 10 of its profile flattened over the lower two-thirds of its height to form the said trapezoidal section.

The cuplike spacing element 5 is dimensioned to fit snugly on to one end of the cylindrical depolarizing dolly 3 so that the spacing fingers 8 embrace the same, and also so that the element 5 fits snugly in the base of the cup electrode 1; i.e., the maximum diameter D of the element, indicated in FIG. 3, is just less than the inside diameter of the cup 1.

Thus, when the spacing element 5 is fitted on one end of the dolly 3 and the latter is then inserted in the cup electrode 1, the dolly will be securely located centrally and coaxially of the cup and with its bottom end insulated from the floor of the cup by the traylike base 6 of the spacing element. The electrolytic paste 4 will then be poured into the annular gap between the dolly and the inside wall of the cup in the usual manner.

The only engagement between the spacing fingers 8 and the inside wall of the cup 1, and thus the only obstruction to the flow of current between the cup and the electrolytic paste, will be where each of the six fingers 8 makes line engagement with the cup wall at the apex 10 of the triangular profile of the finger over the top one-third of its height. Thus such flow of current is virtually entirely unobstructed by the presence of the spacing fingers 8.

The upstanding perimetric flange 7 of the traylike base 6 of the spacing element is moulded with a knife edge so that when the element 5 is engaged on the bottom end of the dolly 3 such edge will be effective, if necessary with some slight manipulation, to cut off any protuberant pieces of depolarizing material extending radially from the cylindrical surface of the dolly at its end, such as sometimes are present. The danger of such pieces of depolarizing material becoming detached after the dolly has been inserted in the cup electrode, and possibly coming into contact with the latter, is thereby removed.

The open end of the cup electrode 1 is closed by a plug which may be of a conventional nature but in this embodiment is formed, and associated with the electrodes, in the manner disclosed and claimed in our said copending application No. 842,274. Thus the plug 19 is made of electrically insulating plastics material and is of generally annular form provided with a central aperture defined by a depending sleeve embracing the top end region of the rod electrode 2 and engaging the top cover plate 28 of the dolly 3 and a peripheral depending skirt 21 engaging the inside wall of the mouth of the cup electrode. The sleeve 20 is formed with a number of cutouts 29 for air circulation within the cell. The dolly cover plate 28 evenly distributes the pressure transmitted to the dolly from the inturned rim of the cup electrode 1 via the plug 19.

A closed annular space is defined between the peripheral face of the plug 19 and the inside wall of the cup near to its rim, which space is filled with sealing material 22. Further, a second annular space is defined between the inside of the plug and the wall of the rod electrode 2, being closed at its top by the flange 27 of a contact cap 23 mounted on the rod electrode, and such second space is also filled with sealing material 24. The sealing material may be asphalt, wax, liquid asphalt, mowilith chloride and resin, adhesive material, of the like.

The rim 25 of the cup electrode 1 is spun over into engagement with the top surface of the plug 19, which is formed with an annular groove 26 near to its periphery for the reception of such rim. The annular groove 26 may be enlarged for the reception of the inturned end of a cardboard or plastic sheath of the cup electrode and the similarly inturned end of an outer metal jacket, if such members are provided.

It will thus be understood that the sealing engagement between the plug 19 and the electrodes 1 and 2 of the cell is of a very secure and moisture-tight nature. Such seal may be enhanced still further if, as is preferred, the plug 19 is made a very tight fit in the mouth of the cell by making its outside diameter slightly greater than the inside diameter of the cup electrode 1, and its inside diameter slightly smaller than the diameter of the rod electrode 2; the plug would, of course in these circumstances be formed of a somewhat resilient plastics material so as to permit its engagement in the open end of the cell. If desired a layer of coagulent adhesive material may be provided between the engaging forces of the plug and the electrodes.

The spacing elements of cells according to the invention may of course, have many more than six spacing fingers if desired. FIG. 4 shows, in axial cross section, the spacing element 11 of another dry cell according to the invention, having 24 spacing fingers 12 which are of a length to extend over the whole height of the dolly when in use and are maintained in mutual parallelism by integral supporting bands 13 encircling the array of fingers at spaced levels so as to form a cagelike element. In this embodiment all of the fingers 11 are of triangular section throughout their length. The base 6 of the element 11 is formed with a knife edge flange 7 similar to that of the element 5 of FIGS. 1 to 3.

FIG. 5 shows, again in axial cross section, the spacing element 14 of another dry cell according to the invention, whose 24 spacing fingers 15 are integral with a flat ring 16 which seats on the top surface of the dolly in use. Each of the fingers 15 is again of triangular profile through its length, and the fingers are of such a length as to extend over substantially the whole height of the dolly. In this case a separate disc 17 of insulating plastics material is provided which underlies the dolly in use so as to insulate the dolly and the carbon rod electrode of the cell from the floor of the cup electrode.

FIG. 6 shows in side elevation, the spacing element 18 of another dry cell according to the invention. In this case the spacing element comprises a single spacing member of moulded plastics electrical insulating material, which is of helical configuration and surrounds the dolly 3 over substantially the whole of its height. The spacing member is again of triangular profile and, as in the FIG. 5 embodiment, a separate insulating disc 17 underlies the dolly 3.

FIG. 7 shows, in axial cross section, the spacing element 19 of a further dry cell according to the invention, which is similar to the element 11 shown in FIG. 4 but has no supporting bands interconnecting its spacing fingers 20. As in the element of FIG. 4, the fingers 20 extend over substantially the whole height of the dolly.

It will thus be seen that the invention provides dry cells which have important advantages over those previously known, primarily in that the spacing means between the depolarizing dolly and the cup electrode wall causes virtually no obstruction to the flow of current between the electrolyte and the cup electrode so that the efficiency of the cell is substantially increased.

We claim:

1. An electric dry cell comprising an outer cup electrode, a central rod electrode, a depolarizing dolly surrounding the rod electrode and spaced from said cup electrode, electrolytic paste in the tubular space between the depolarizing dolly and the wall of the cup electrode, and spacing means located in said tubular space to maintain the depolarizing dolly out of engagement with the cup electrode wall, said spacing means comprising at least one elongate spacing member formed of moulded plastics electrical insulating material and being of substantially triangular shape in transverse cross section at least where it engages the cup electrode wall, one face of such triangular section facing inwardly towards the depolarizing dolly while the apex opposite such face faces outwardly towards the cup electrode wall.

2. A cell according to claim 1, wherein the apex line of the triangular profile of said spacing member is scalloped so as to make a plurality of point contacts with the cup wall.

3. A cell according to claim 1, wherein the said spacing means is integral with a base element formed of moulded plastics electrical insulating material, which base element underlies the said dolly and insulates the dolly and the rod electrode from the floor of the cup electrode.

4. A cell according to claim 3, wherein the said base element is formed with an upstanding knife-edged perimetric flange, so that when the spacing means is engaged on the dolly during assembly of the cell the edge of such flange will cut off any protruding pieces from around the edge of the dolly before it is inserted in the cup electrode.

5. A cell according to claim 3, wherein the said spacing means comprises a number of fingerlike spacing members upstanding from the periphery of the said base element and spaced around the said dolly.

6. A cell according to claim 5, wherein the said spacing members are of such a height as to extend to less than half of the height of the dolly.

7. A cell according to claim 6, wherein each of the said spacing members is formed so as to engage the cup electrode wall only in the region of such member remote from its connection with the said base element.

8. A cell according to claim 1, wherein the said spacing means is supported from an integral ring of moulded plastics insulating material supported by the outer surface of the dolly, around the periphery of the latter.

9. A cell according to claim 8, wherein the said spacing means comprises a number of fingerlike spacing members spaced around the said dolly.

10. A cell according to claim 5, wherein the said spacing members are of such a length as to extend over substantially the whole of the height of the dolly.

11. A cell according to claim 9, wherein the said spacing members are interconnected by at least one integrally moulded supporting band at a level to maintain the spacing members in predetermined positions relative to one another.

12. A cell according to claim 1 wherein the said spacing means comprises at least one spacing member of helical configuration surrounding the dolly over at least part of its height.

13. A cell according to claim 1, wherein the spacing means comprises a number of parallel elongate spacing members which are constituents of a netlike moulded plastics sheet wrapped around the dolly.

14. A cell according to claim 1, having a plug made of electrically insulating plastics material mounted in the open end of the cup electrode to seal such open end, said plug being gripped around its periphery by an inturned rim of the cup electrode and having a central aperture whose wall embraces the outer end region of the rod electrode, a first annular enclosed space being provided between a peripheral face of the plug and the inside surface of the inturned rim of the cup electrode, and a second annular enclosed space being provided between a face of the central aperture of the plug and the wall of the rod electrode, both of such spaces being filled with sealing material.